United States Patent
Diener et al.

(10) Patent No.: US 10,024,362 B2
(45) Date of Patent: Jul. 17, 2018

(54) OLEOPHILIC BEARING WITH SURFACE-MODIFIED PART MADE OF STAINLESS ROLLING BEARING STEEL

(71) Applicants: Christof Diener, Nagold (DE); GRW gebr. reinguft gmbH & Co. KG, Rimpar (DE)

(72) Inventors: Christof Diener, Nagold (DE); Herbert Niedermeier, Poppenhausen (DE)

(73) Assignee: GRW GEBR. REINFURT GMBH & CO. KG, Rimpar (DE)

( * ) Notice: Subject to any disclaimer, the term of this patent is extended or adjusted under 35 U.S.C. 154(b) by 0 days.

(21) Appl. No.: 15/486,691

(22) Filed: Apr. 13, 2017

(65) Prior Publication Data

US 2017/0219010 A1    Aug. 3, 2017

Related U.S. Application Data

(63) Continuation of application No. PCT/EP2015/072931, filed on Oct. 5, 2015.

(51) Int. Cl.
*F16C 33/66*    (2006.01)
*F16C 33/64*    (2006.01)
(Continued)

(52) U.S. Cl.
CPC ......... *F16C 33/6607* (2013.01); *F16C 19/54* (2013.01); *F16C 33/32* (2013.01);
(Continued)

(58) Field of Classification Search
CPC ......... F16C 19/54; F16C 33/32; F16C 33/62; F16C 33/664; F16C 33/6607;
(Continued)

(56) References Cited

U.S. PATENT DOCUMENTS 2,492,994 A * 1/1950 Harman ............... C08K 5/5317
106/284.1
3,300,306 A * 1/1967 Sevens .................... G03C 8/06
101/467
(Continued)

FOREIGN PATENT DOCUMENTS

DE          2456179 A1     6/1975
DE       25 46 061 A1     4/1976
(Continued)

*Primary Examiner* — Marcus Charles
(74) *Attorney, Agent, or Firm* — Hackler Daghighian Martino & Novak

(57) ABSTRACT

In order to make a bearing, such as a roller bearing, insensitive to a lack of maintenance lubrication or irregular maintenance lubrication while at the same time retaining its mechanical performance, at least one bearing part of the bearing is provided at least partially with an oleophilic adhesion promoter layer. The adhesion promoter layer binds a lubricant layer of the bearing to the bearing part provided with the adhesion promoter layer. The adhesion promoter layer is bonded to an elemental-iron-free surface of a bearing part body. The removal of free iron from the bearing part body surface is carried out with nitric acid, chromate solution and/or citric acid. The treated bearing part has an oleophilic anti-corrosion adhesion promoter layer. The bearing may be used in pressure-operated devices, in particular in turbine handpieces used by dentists, because the loss of the lubricant layer during operation of the device was particularly high.

10 Claims, 4 Drawing Sheets

(51) Int. Cl.
*F16C 33/32* (2006.01)
*F16C 19/14* (2006.01)
*F16C 19/54* (2006.01)
*F16C 33/62* (2006.01)

(52) U.S. Cl.
CPC ............ *F16C 33/62* (2013.01); *F16C 33/64* (2013.01); *F16C 33/664* (2013.01); *F16C 33/6633* (2013.01); *F16C 2202/66* (2013.01); *F16C 2300/12* (2013.01); *F16C 2316/13* (2013.01)

(58) Field of Classification Search
CPC .............. F16C 2202/66; F16C 2300/12; F16C 2316/13; F16C 33/6633
USPC ........ 384/213, 261, 462.492, 527, 592, 625, 384/907, 907.1
See application file for complete search history.

(56) References Cited

U.S. PATENT DOCUMENTS

| | | | |
|---|---|---|---|
| 3,928,278 A | | 12/1975 | Azrak et al. |
| 7,387,442 B2 * | | 6/2008 | Spikes .................... F16C 17/04 384/276 |
| 2013/0163908 A1 * | | 6/2013 | Haag ..................... F16C 33/445 384/470 |
| 2013/0302609 A1 | | 11/2013 | Bongaerts et al. |
| 2016/0076587 A1 * | | 3/2016 | Chitose ............... F16C 33/1095 384/299 |

FOREIGN PATENT DOCUMENTS

| | | | | |
|---|---|---|---|---|
| DE | 101 62 965 A1 | | 3/2003 | |
| DE | 101 57 316 A1 | | 6/2003 | |
| DE | 10 2008 053 444 A1 | | 4/2010 | |
| DE | 10 2008 050401 A1 | | 4/2010 | |
| DE | 10 2010 053 325 A1 | | 8/2011 | |
| DE | 10 2010 012 901 A1 | | 9/2011 | |
| DE | 102010013184 A1 * | | 9/2011 | ............ F16C 19/522 |
| DE | 10 2010 018 891 A1 | | 11/2011 | |
| DE | 10 2010 019 953 A1 | | 11/2011 | |
| DE | 10 2011 001 754 A1 | | 3/2012 | |
| DE | 10 2010 063393 A1 | | 6/2012 | |
| DE | 10 2011 077 023 A1 | | 12/2012 | |
| DE | 10 2011 088 232 A1 | | 6/2013 | |
| DE | 10 2013 223 168 A1 | | 9/2014 | |
| EP | 2 014 938 A1 | | 1/2009 | |
| EP | 2 327 894 A1 | | 1/2011 | |
| GB | 2386928 A * | | 10/2003 | .............. F16C 17/04 |
| GB | 2521394 * | | 6/2015 | .............. F16J 15/064 |
| JP | 58005530 A * | | 1/1983 | .............. F16C 33/34 |
| JP | 58091923 A * | | 6/1983 | |
| JP | 2005 326021 A | | 11/2005 | |
| JP | 2012 056165 A1 | | 3/2012 | |
| JP | 2014 095437 A | | 5/2014 | |
| RU | 2034064 C1 * | | 4/1995 | ............ C22B 11/00 |
| WO | 03 083318 A1 | | 10/2003 | |
| WO | 2007 012472 A1 | | 2/2007 | |

* cited by examiner

OLEOPHILIC BEARING WITH SURFACE-MODIFIED PART MADE OF STAINLESS ROLLING BEARING STEEL

CROSS-REFERENCE TO RELATED APPLICATIONS

This continuation application claims priority to PCT/EP2015/072931 filed on Oct. 5, 2015 which has published as WO 2016/058857 A1 and also the German application number 10 2014 220 872.6 filed on Oct. 15, 2014, the entire contents of which are fully incorporated herein with these references.

DESCRIPTION

Field of the Invention

The invention relates to a bearing having an inner ring and an outer ring which is rotatable relative to the inner ring, wherein the inner ring has an inner ring body made of stainless rolling bearing steel and the outer ring has an outer ring body made of stainless rolling bearing steel, and wherein a lubricant layer is formed on at least part of the surface between the inner ring and the outer ring.

The invention relates further to a method for producing such a bearing.

Background of the Invention

The lifetime and frictional resistance of a bearing whose bearing parts are provided at least partially with a lubricant layer are determined mainly by the wetting of the bearing parts with the lubricant layer: if the contact surfaces of the bearing parts are no longer covered with the lubricant, there is increased friction of the bearing parts as a result of wear. Rapidly rotating, non-sealed bearings in particular must therefore be lubricated at regular maintenance intervals. If such a maintenance interval is inadvertently forgotten, it can result in failure of the bearing.

One approach at lengthening the maintenance intervals or even making them superfluous altogether consists in lowering the wettability of the bearing parts for the lubricants with the aid of a coating of the bearing parts in the regions in which no lubricant is to be accumulated. A rolling bearing having such bearing parts has become known from DE 10 2011 088 232 A1, for example.

A further bearing component having an oleophobic coating has become known from DE 10 2011 077 023 A1.

WO 2007/012472 A1 further discloses a method for the plasma-based production of oleophobic or lipophobic layers. WO 2007/012472 A1 discloses in particular a fluorocarbon polymer layer which is produced by means of a plasma polymerization of perfluorocycloalkanes. The fluorocarbon polymer layers themselves act as the lubricant layer.

A rolling bearing having oleophilic sealing lips has become known from DE 10 2010 063 393 A1. The sealing lips are thereby provided with a hydrophobic coating in some regions.

DE 10 2008 050 401 A1 further discloses a sliding bearing for a turbocharger. The sliding bearing has a stationary oleophobic bearing surface and a movable oleophilic bearing surface.

WO 03/083318 A1 teaches forming a bearing having a first bearing part and a second bearing part. The first bearing part is oleophilic and wetting, while the second bearing part is oleophobic and non-wetting.

A metal bearing having two bearing parts which are movable relative to one another has become known from EP 2 014 938 A1. Magnetic particles are provided between the bearing parts.

DE 10 2010 012 901 A1 discloses a rolling body. The rolling body has an oleophilic diamond-like carbon layer (DLC layer).

Further rolling bodies having a DLC coating have become known from DE 10 2010 012 903 A1, DE 10 2010 018 891 A1 and DE 10 2010 019 953 A1. The DLC coating is thereby deposited by means of a plasma process.

Finally, DE 10 2010 053 325 A1 discloses a sliding bearing and a method for producing a sliding bearing. One bearing part of the bearing is thereby provided with an additional material by means of laser coating.

However, the known bearings either have an inadequate mechanical load-bearing capacity, rust, or retain lubricant contained in the bearing for only a short time in the bearing.

Accordingly, the object of the present invention is to provide a bearing which simultaneously has good lubricant adhesion between the bearing parts, high corrosion resistance and a high mechanical load-bearing capacity. It is a further object of the present invention to provide a method for producing such a bearing.

SUMMARY OF THE INVENTION

The object is achieved according to the invention by a bearing having the features of patent claim 1 and by a method having the method steps of patent claim 7. The dependent claims describe preferred variants.

The object according to the invention is accordingly achieved by a bearing having an inner ring and an outer ring which is rotatable relative to the inner ring, wherein the inner ring has an inner ring body made of stainless rolling bearing steel and the outer ring has an outer ring body made of stainless rolling bearing steel, and wherein a lubricant layer is formed on at least part of the surface between the inner ring and the outer ring, wherein at least part of the surface of the inner ring body and/or of the outer ring body is elemental-iron-free and the surface of the inner ring and/or of the outer ring is bonded to an oleophilic adhesion promoter layer of the bearing.

The bearing according to the invention accordingly has at least an inner ring and an outer ring. The inner ring is preferably arranged coaxially with the outer ring.

The inner ring has an inner ring body made of stainless rolling bearing steel. The outer ring has an outer ring body made of stainless rolling bearing steel. A stainless rolling bearing steel is understood as being a martensitic stainless steel, that is to say a through-hardenable steel. The stainless rolling bearing steel is in particular in the form of X20Cr13, X30Cr13, X30CrMoN15-1, X39Cr13, X46Cr13, X65Cr13, X90CrMoV18, X65CrMo14, X70CrMo15, X45CrMoV15, X17CrNi16-2, X20CrNi17-2 and/or X105CrMo17.

The inner ring body and/or the outer ring body are at least partly, in particular completely, free of elemental iron on their surface. An elemental-iron-free surface is understood as being a surface on which the copper sulfate test does not work. In the copper sulfate test, the inner ring body or the outer ring body is immersed in a slightly acidic copper sulfate solution having a pH not less than three. The following reaction steps thereby take place:

If the copper sulfate test "works", copper is accordingly deposited on the surface of the inner ring body or of the outer ring body. If, on the other hand, a firmly adhering copper coating fails to form on the inner ring body or on the outer ring body, the surface is free of elemental iron or free of iron.

Preferably, the inner ring body and/or the outer ring body are at least partly, in particular completely, iron-free on their surface. The elemental-iron-free or iron-free surface of the inner ring body and/or of the outer ring body is/are bonded to an oleophilic adhesion promoter layer.

The combination according to the invention is surprisingly both corrosion-resistant and mechanically very stable, while at the same time the lubricant adheres well in the bearing. In other words, an oleophilic anti-corrosion adhesion promoter layer is present. The mentioned properties are thereby significantly improved over the bearings known from the prior art. This is particularly noteworthy since the mentioned properties are normally mutually exclusive, for example increased corrosion resistance generally reduces the mechanical stability of a bearing.

The elemental-iron-free or iron-free layer on the surface of the inner ring body or of the outer ring body has a thickness of from 5 nm to 30 nm, preferably from 10 nm to 20 nm, particularly preferably a thickness of from 10 nm to 15 nm.

Since the inner ring has a particularly great influence on the running characteristics of a bearing, preferably at least the surface of the inner ring body is at least partly, in particular completely, elemental-iron-free or iron-free. The inner ring thereby has the oleophilic adhesion promoter layer preferably at least partly, in particular completely.

In a particularly preferred embodiment of the invention, the groove of the inner ring and the shoulder of the inner ring are elemental-iron-free or iron-free and have an oleophilic adhesion promoter layer. The groove is understood as being the raceway of the inner ring, and the shoulder is understood as being the thrust collar of the inner ring. It has been shown that the groove and the shoulder of the inner ring are the regions in which the surface modification according to the invention brings the greatest advantages because, when these surfaces are modified, neither a ball (in the groove) nor a cage (on the shoulder) "run dry".

The bearing can be in the form of a sliding bearing. Preferably, however, the bearing is in the form of a rolling bearing. The rolling bearing can be in the form of, for example, a turbopump bearing, a spindle bearing or a flowmeter bearing.

The rolling bearing according to the invention is preferably a rolling bearing for mounting rotating parts in dental turbine handpieces. Such a rolling bearing has a speed parameter $n \times d_m > 1,000,000$ mm/min, where n corresponds to the inner ring speed in $min^{-1}$ and $d_m$ corresponds to the mean bearing diameter in mm and $d_m$ is calculated from the sum of the outside diameter and the bore diameter of the bearing, divided by 2.

The rolling bearing is preferably in the form of a deep groove ball bearing or an angular contact bearing. If the bearing is in the form of a deep groove ball bearing or of an angular contact bearing, it has a plurality of balls and a cage for guiding the balls.

A ball of the bearing can have a ball body which is elemental-iron-free on at least part of its surface, wherein the surface of the ball has an oleophilic adhesion promoter layer. Preferably all the balls of the bearing have the above features, so that particularly good adhesion of the lubricant layer in the bearing is obtained.

The adhesion promoter layer preferably has a silicon-carbon-oxygen-hydrogen bond in order to hold the lubricant layer securely in the bearing. The adhesion promoter layer can particularly preferably comprise silane, in particular mercaptosilane. In the case of mercaptosilane, a particularly good oleophilic action of the adhesion promoter layer is observed.

The adhesion promoter layer according to the invention preferably has a dyne value of from 30 mN/m to 60 mN/m, preferably from 40 mN/m to 50 mN/m. The oleophilic (lipophilic) adhesion promoter layer thereby permits both good wetting of the coated bearing part by the lubricant and a high mechanical load-bearing capacity of the first bearing part.

The adhesion promoter layer can comprise a constituent based on isocyanate, on methyl isocyanate, on butyl isocyanate, on ethyl isocyanate, on phenyl isocyanate, on methyl acrylate and/or on epoxy resin. The adhesion promoter layer can further comprise acetylacetone, resorcinol, tert-butyl alcohol, butyl titanate, butyl acetate, zirconate, zirconium aluminate, titanate and/or propan-2-ol.

The composition of the adhesion promoter layer is preferably such that it withstands repeated steam sterilization at 136° C., so that the bearing can be fitted into a medical device and sterilized together with the medical device.

The adhesion promoter layer can comprise a silane-modified polymer, trichloro(dichloromethyl)silane, trichloro (phenethyl)silane, isobutyl(trimethoxy)silane,2-cyclohexan-1-yl(trimethyl)silane, bis(2-chlorobenzyl)silane, butyltimethyl(2,3,4,5-tetrafluorophenyl)silane, (4-bromobutoxy)(trimethyl)silane, (4-chlorobenzoyl)(triphenyl)silane, (4-ethoxyphenyl)(ethynyl)isopropyl(methyl)silane, bis(3-phenylpropyl)silane, dicyclohexyl-methyl-silane, dimethyl (2,3,6-trichlorophenyl)silane, dodecyltris(2-cyclohexylethyl)silane, ethoxytris(2-methoxyphenyl)silane, N(2) amino-ethyl-3-aminopropyltrimethoxysilane, ethylenebis (tris(decyl)silane), hexadecyltris(4-chlorophenyl)silane, methyltris(2-methoxyethoxy)silane, methyltris-(pentafluorophenyl)silane, (4-methoxy-1-cyclohexan-1-yl)(trimethyl) silane, (3-mercaptopropyl)trimethoxysilane, octadecyltris (2-biphenylyl)silane, octadecyltris(3-chlorophenyl)silane, phenyl(o-tolyl)silane, phenyltris(3-phenylpropyl)silane, phenyltris(9-fluorenyl)silane, (3-chloropropyl)trimethoxysilane, (3-aminopropyl)trimethoxysilane, (3-iodopropyl) trimethoxysilane, trimethoxy[3-(methylamino)propyl]silane, trimethoxy(3,3,3)-trifluoropropylsilane, (3-glycidyloxypropyl)trimethoxysilane, (3-iodopropyl) trimethoxy-silane, trimethyl[2-(trimethylsilyl)methyl]-2-propenyl]silane, trimethyl(1-methyl-1,2-diphenylethyl)silane, trimethyl(4-(trimethylsilyl)butoxy)silane, tetrakis(2-methoxyphenyl)silane, tetrakis(3-phenylpropyl)silane, tetrakis(4-(dimethylamino)phenyl) silane, n-hexyltrichlorosilane, chloropropyltriethoxysilane and/or aminoethylaminopropylsilane. Silane is understood as meaning compositions comprising Si—H, in particular $SiH_4$ or compositions comprising $SiH_4$. The adhesion promoter layer can further be produced from one or more of the above-mentioned substances.

A particularly oleophilic adhesion promoter layer can be achieved by a fluorine-free and DLC (diamond-like carbon)-free adhesion promoter layer.

Further preferably, the inner ring, the outer ring and/or at least one ball can have on their surface the functional group of the alcohols and phenols that is bonded to the adhesion promoter layer. In other words, the elemental-iron-free surface is preferably bonded to the adhesion promoter layer via an OH group.

The lubricant layer preferably has an initial lubrication in the form of a lubricating grease. The lubricating grease can comprise a thickener, in particular a polyurea, a calcium complex soap or a mixture of a polyurea and a calcium complex soap, and a base oil. Alternatively or in addition, the lubricant layer preferably comprises an oil which comprises a synthetic hydrocarbon oil and/or an ester oil and/or a mineral oil. This oil adheres particularly well in the bearing.

The object according to the invention is further achieved by a method for producing a bearing described above, comprising the method steps:
1. removing elemental iron from at least part of the surface of the inner ring body, of the outer ring body and/or of the ball body;
2. applying an oleophilic adhesion promoter layer to at least part of the surface of the inner ring, of the outer ring and/or of the ball.

Surface modification to remove elemental iron in method step 1 can be carried out by sputtering or galvanization, in particular by chrome plating or nickel plating.

The surface modification to remove elemental iron in method step 1 is carried out preferably with citric acid, nitric acid and/or a chromate solution, in particular a dichromate solution. This is not a conventional etching process, that is to say there is virtually no measurable loss of mass. Otherwise, the roughness of the modified surface would increase significantly, which would reduce the running smoothness of the bearing. Rather, the elemental iron is selectively chemically bonded and/or—preferably —removed almost completely from the surface.

Nitric acid ($HNO_3$) is preferably used for the surface modification; nitric acid converts the elemental iron constituents into water-soluble nitrates. By using a chromate solution, iron is further oxidized to iron(III). Nitrogen oxide is further formed. The iron goes into solution. An increased chromium concentration remains on the surface. The increased chromium concentration oxidizes—preferably in reaction with nitric acid —to chromium oxide, which forms a protective layer.

The surface modification is particularly preferably carried out by addition of the above-described wet chemistry with a temperature of more than 25° C., in particular of more than 40° C., preferably with a temperature of more than 55° C. The surface modification is carried out significantly more quickly as a result, and more resistant surfaces are achieved.

For better binding of the adhesion promoter layer, in a second method
2. the elemental-iron-free surface of the inner ring body, of the outer ring body and/or of the ball body can be coated with the functional group of the alcohols and phenols.

Preferably, the above-described surface modifications are carried out before the bearing is assembled, in particular before method step 4, namely mounting of the inner ring in the outer ring.

The adhesion promoter layer can be applied by the plasma method. A particularly homogeneous adhesion promoter layer can be produced by the plasma polymerization of fluorine-free organic compounds, in particular by the plasma polymerization of ethyne, acetone, and/or acrylate(s).

Alternatively, the adhesion promoter layer can also be applied by an immersion method. In particular, silane as the adhesion promoter layer can be applied by at least partially immersing a bearing part in a solution of silane and acetone. Silane can further be applied by a vapor deposition method.

Alternatively or in addition to the described method steps, the surface of at least one bearing part can be mechanically roughened in the nanometer range and/or electropolished prior to the surface modification.

At least part of the surface of the bearing part can further be cleaned in plasma. Binding of the layer(s) applied to the cleaned surface is thereby improved further.

The advantages of the above-described bearing and production method could be demonstrated in a lifetime test on an automated dental test bench. 10 test turbines (from dental turbine handpieces) in each case having rolling bearings according to the invention, in which the inner ring was coated, and standard rolling bearings according to the prior art were compared. All the rolling bearings were lubricated with synthetic hydrocarbon oil prior to the lifetime test and were not re-lubricated in the further course of the tests so that the influence of the oil wettability of the bearing parts on the lifetime of the rolling bearings could be evaluated objectively. The dental test bench simulated the loads which are transmitted to a drilling tool of the turbine handpiece by the dentist. As the wear on the bearing parts increased, the friction torque into the rolling bearings increased, so that the required idle speed which is normally established in the unloaded state was no longer achieved. In this case, the automated test bench stopped the turbine handpiece. The stop was classified as a failure, the running time to failure was documented. After evaluating the tests it was found that the lifetime of the rolling bearings according to the invention is at least 70% longer compared to the standard rolling bearings.

The above-described method steps 1 to 4 are preferably carried out in the described order.

Further advantages and features of the invention will become apparent from the following detailed description of an embodiment of the invention, by reference to the figures of the drawing, which shows details that are fundamental to the invention, and also from the patent claims.

The features shown in the drawing are represented in such a manner that the special features according to the invention can be made clearly visible. The various features can be realised in variants of the invention each on their own or in any desired combinations.

DETAILED DESCRIPTION OF THE PREFERRED EMBODIMENTS

Figure 1:
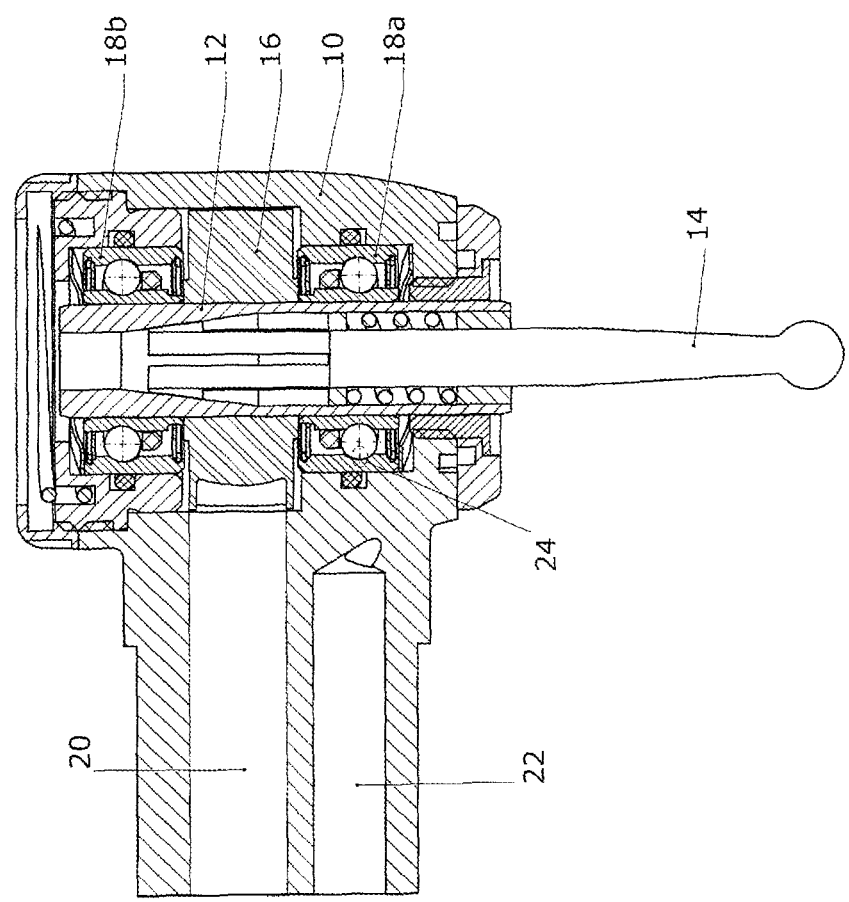
FIG. 1 is a cutaway view of a dental turbine handpiece.

FIG. 1 shows a turbine handpiece 1 used by dentists in cross-section. It has a housing 10 in which a rotor shaft 12 is arranged. A rotor 16 is arranged on the rotor shaft 12, which is connected to a tool 14. The tool 14 can be in the form of a drilling tool, a grinding tool or the like.

The rotor shaft 12 is supported by a first bearing 18a according to the invention in the form of a rolling bearing and a second bearing 18b according to the invention, which is likewise in the form of a rolling bearing. The rotor 16 is driven by compressed air, which is guided to the rotor 16 by an air supply channel 20. The compressed air is conveyed away via an air outlet channel 22.

The bearings 18a, 18b cannot be provided with grinding covers (sealing disks), since these would lead to high friction torques in the bearings 18a, 18b, so that the idle speeds of up to 500,000 min$^{-1}$ required by dental customers could not be achieved. The idle speed is the maximum speed of the rotor shaft 12 which is established when no external loads are acting on the tool 14. During dental treatment, axial and radial forces are transmitted to the drilling tool 14, so that the speed of the rotor shaft 12 in the load phase of the turbine handpiece 1 falls significantly. The bearings 18a, 18b used can therefore not be sealed but only covered.

However, such a cover disk has the disadvantage in rolling bearings according to the prior art that there is a gap between the inner ring and the cover disk of the rolling bearing, through which the lubricant layer used in the rolling bearings can pass to the outside. In dental turbine bearings, the effect of the loss of lubricant is enhanced by the fact that supplied compressed air is able to escape to the outside not only via the air outlet channel but also through the rolling bearings. This leads overall to the lubricant layer being transported away and thus to a situation of inadequate lubrication in the rolling bearings. The typical consequence in the prior art is that the bearing parts of the rolling bearings, in particular the inner ring, outer ring, balls and cage thereof, move in the mixed or boundary friction region. This in turn leads to abrasive wear of the bearing parts of the rolling bearings and consequently to the premature failure thereof.

In order to remedy this problem, the bearings 18a, 18b according to the invention are provided with a lubricant coating which interacts with functionalized surfaces of the bearing parts and is thus not carried off, or is carried off only slightly, by the compressed air flowing through the bearings 18a, 18b. This results in a significantly longer lifetime of the bearings 18a, 18b, even if they are not re-lubricated or are re-lubricated only irregularly.

Figure 2:
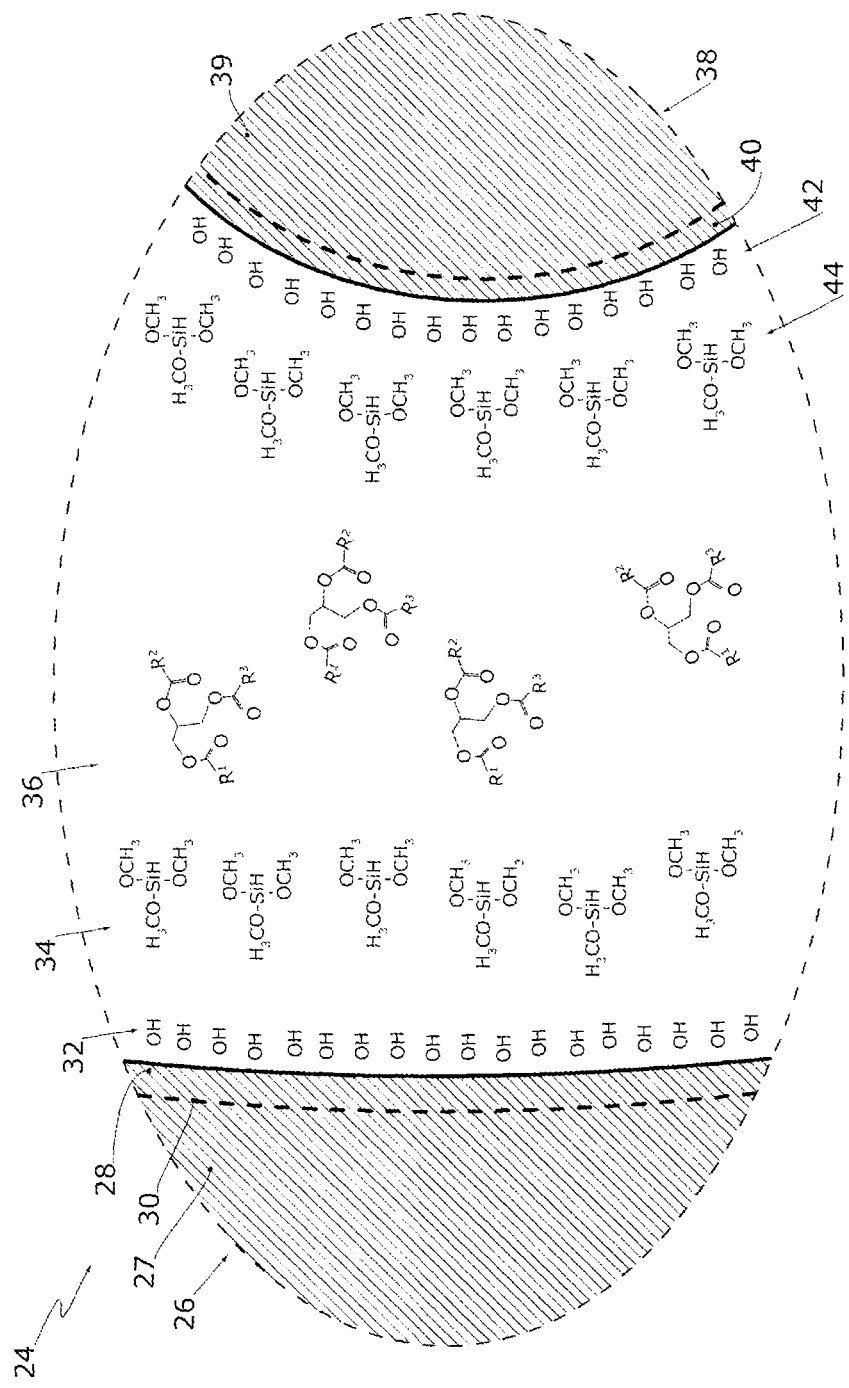
FIG. 2 is a highly diagrammatic detailed view from FIG. 1.

FIG. 2 shows an enlarged detail 24 from FIG. 1 in highly diagrammatic form. The detail 24 shows a first bearing part in the form of an outer ring 26 of stainless rolling bearing steel. The first bearing part is chosen in the form of an outer ring 26 merely by way of example for reasons of representation. In a further preferred embodiment, the first bearing part is an inner ring.

An outer ring body 27 of the outer ring 26 has a surface 28 which has been wet-chemically treated with nitric acid and dichromate solution. The treatment depth—indicated in FIG. 2 by the broken line 30—is only a few nanometers. A hydroxyl group layer 32 has been deposited on the treated and subsequently cleaned surface 28 by means of an H$_2$O plasma. The hydroxyl group layer 32 serves to anchor an oleophilic adhesion promoter layer 34. The adhesion promoter layer has a silicon-carbon-oxygen-hydrogen bond. The adhesion promoter layer 34 binds a lubricant layer 36. The lubricant layer 36 is represented in FIG. 2 by grease molecules, wherein the variables R$^1$, R$^2$ and R$^3$ serve as representatives of alkyl or alkenyl radicals having a usually uneven number of carbon atoms. Alternatively or in addition to the grease molecules, the lubricant layer can comprise molecules of an oil.

Opposite the first bearing part there is a second bearing part in the form of a ball 38. The second bearing part is represented as a ball with a small radius merely by way of example. The second bearing part 38 can also be an inner ring. The ball 38 has a ball body 39 made of stainless rolling bearing steel. The ball body 39 has, analogously to the outer ring 26, a modified surface 40, a hydroxyl group layer 42 and an adhesion promoter layer 44. The adhesion promoter layer 44 also binds the lubricant layer 36. The lubricant layer 36 can as a result be retained securely between the first bearing part in the form of an outer ring 26 and the second bearing part in the form of a ball 38.

Figure 3A:
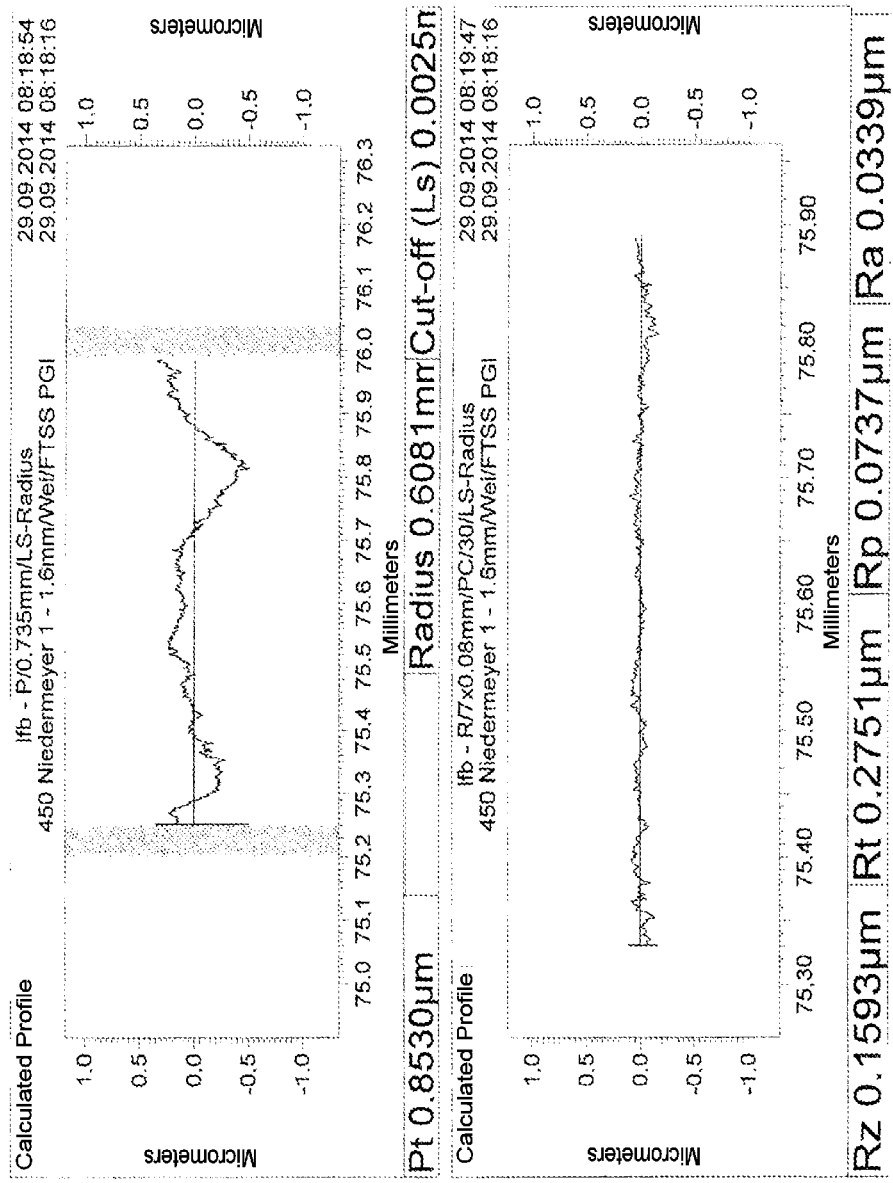
FIG. 3a shows a roughness measurement of the raceway of an inner ring body prior to the removal of elemental iron.

FIG. 3a shows a roughness measurement of a surface of the raceway of an inner ring body of a bearing according to the invention prior to modification with nitric acid and dichromate solution. The bearing surface of the inner ring body has a mean roughness index of Ra=0.0339 μm.

Figure 3B:
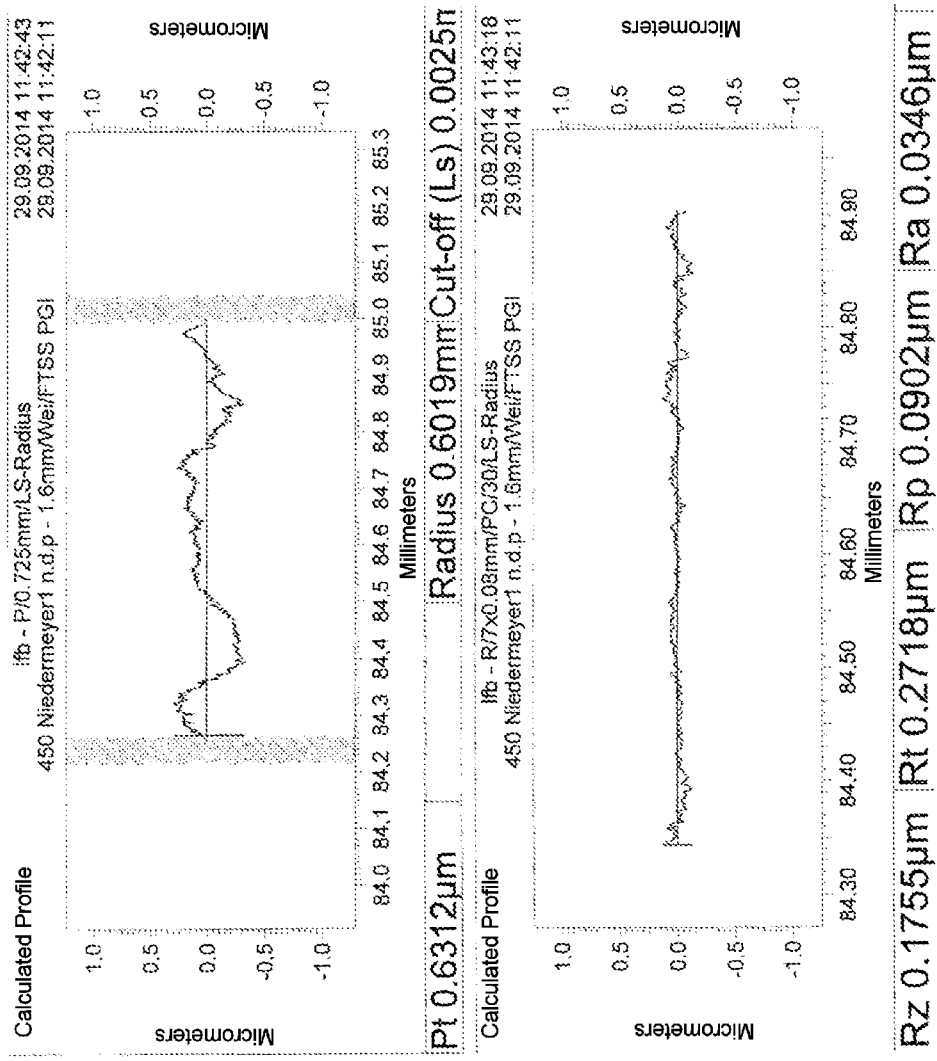
FIG. 3b shows a roughness measurement of the raceway of the inner ring body from FIG. 3a after the removal of elemental iron.

FIG. 3b shows a roughness measurement of a surface of the raceway of the inner ring body according to FIG. 3a after modification with nitric acid and dichromate solution. The bearing surface of the inner ring body now has a mean roughness index of Ra=0.0346 μm. A comparison of the two measurements according to FIG. 3a and FIG. 3b shows that the mean roughness has not increased significantly as a result of the surface modification. The surface modification is accordingly not an etching process but rather a treatment method for selectively removing elemental iron from the surface of the bearing part body.

In summary, the invention relates to the lubrication of a bearing, in particular of a rolling bearing. In order to make the bearing insensitive to a lack of maintenance lubrication or irregular maintenance lubrication while at the same time retaining its mechanical performance, at least one bearing part of the bearing is provided at least partially with an oleophilic adhesion promoter layer. The adhesion promoter layer binds a lubricant layer of the bearing to the bearing part provided with the adhesion promoter layer. The adhesion promoter layer is bonded to an elemental-iron-free surface of a bearing part body. The removal of free iron from the bearing part body surface is carried out preferably with nitric acid, chromate solution and/or citric acid. Overall, the treated bearing part has an oleophilic anti-corrosion adhesion promoter layer. The bearing according to the invention distinguishes itself especially when used in pressure-operated devices, in particular in turbine handpieces used by dentists, since the loss of the lubricant layer during operation of the device was hitherto particularly high here.

What is claimed is:

1. A bearing, comprising:
   an inner ring;
   an outer ring which is rotatable relative to the inner ring;
   wherein the inner ring has an inner ring body made of stainless steel and the outer ring has an outer ring body made of stainless steel;
   wherein a lubricant layer is formed on at least part of either an inner ring surface between the inner ring and the outer ring and/or an outer ring surface between the inner ring and the outer ring; and
   wherein at least part of either surface of the inner ring body and/or of the outer ring body is elemental-iron-free and is bonded to an oleophilic adhesion promoter layer.

2. The bearing as claimed in claim 1, wherein the bearing is in the form of a rolling bearing.

3. The bearing as claimed in claim 2, wherein the bearing is in the form of a deep groove ball bearing or an angular contact bearing, wherein the bearing comprises a plurality of balls and a cage for guiding the balls.

4. The bearing as claimed in claim 3, wherein at least one ball has a ball body having at least part of a surface of the ball of which is elemental-iron-free, wherein the surface of the ball has an oleophilic adhesion promoter layer.

5. The bearing as claimed in claim 3, wherein the inner ring, the outer ring and/or the ball has on its surface a functional group of alcohols and phenols which is bonded to the oleophilic adhesion promoter layer.

6. The bearing as claimed in claim 1, wherein the oleophilic adhesion promoter layer has a silicon-carbon-oxygen-hydrogen bond.

7. A method for producing a bearing, the bearing comprising an inner ring, an outer ring which is rotatable relative to the inner ring, and a plurality of balls between the inner and outer rings, wherein the inner ring has an inner ring body made of stainless steel, wherein the outer ring has an outer ring body made of stainless steel, wherein each ball of the plurality of balls have ball bodies made of stainless steel, wherein a lubricant layer is formed on at least part of either an inner ring surface between the inner ring and the outer ring, an outer ring surface between the inner ring and the outer ring, and/or a surface of the plurality of balls, and wherein at least part of either surface of the inner ring body, the outer ring body and/or the ball bodies is elemental-iron-free and is bonded to an oleophilic adhesion promoter layer, the method comprising the steps of:

(1) removing elemental iron from at least part of either surface of the inner ring body, of the outer ring body and/or of the ball bodies;

(3) applying an oleophilic adhesion promoter layer to at least part of either surface of the inner ring, the outer ring and/or the plurality of balls.

8. The method as claimed in claim 7, wherein the elemental iron is removed in method step 1 with citric acid, nitric acid and/or a chromate solution.

9. The method as claimed in claim 8, including a second (2) method step between method steps (1) and (3) the elemental-iron-free surface of the inner ring body, of the outer ring body and/or of the ball bodies are coated with a functional group of alcohols and phenols.

10. The method as claimed in claim 9, including in a fourth (4) method step wherein the inner ring is mounted in the outer ring.

* * * * *